United States Patent [19]

Jabbal

[11] 4,255,773
[45] Mar. 10, 1981

[54] GROUND FAULT INTERRUPTOR

[76] Inventor: Harbhajan S. Jabbal, 2F/14 Double Storey Circular Rd. N.I.F., Haryana, India

[21] Appl. No.: 11,695

[22] Filed: Feb. 12, 1979

Related U.S. Application Data

[63] Continuation of Ser. No. 816,749, Jul. 18, 1977, abandoned.

[30] Foreign Application Priority Data

Mar. 24, 1977 [GB] United Kingdom ............... 12452/77

[51] Int. Cl.³ ............................................. H02H 3/33
[52] U.S. Cl. .................................... 361/45; 361/187; 340/650
[58] Field of Search .............. 361/44, 45, 47, 93, 361/187, 206; 335/151; 340/649, 650, 651

[56] References Cited

U.S. PATENT DOCUMENTS

| | | | |
|---|---|---|---|
| 3,525,903 | 8/1970 | Morris et al. | 361/45 |
| 3,535,590 | 10/1970 | Mayer | 361/45 |
| 3,654,515 | 4/1972 | Kato et al. | 361/45 |
| 3,991,366 | 11/1976 | Schweitzer, Jr. | 361/93 X |
| 4,064,546 | 12/1977 | Domanski | 335/151 X |

*Primary Examiner*—Patrick R. Salce
*Attorney, Agent, or Firm*—Hammond & Littell, Weissenberger and Muserlian

[57] ABSTRACT

A ground fault interruptor comprising a reed relay connected to the secondary of a differential transformer, a load connected to the primary windings of said transformer through the contacts of a relay or circuit breaker, a power supply circuit for said relay or circuit breaker, a biasing circuit connected to said reed relay and a signal processing circuit for processing the signal from the secondary of said transformer to said reed relay.

6 Claims, 1 Drawing Figure

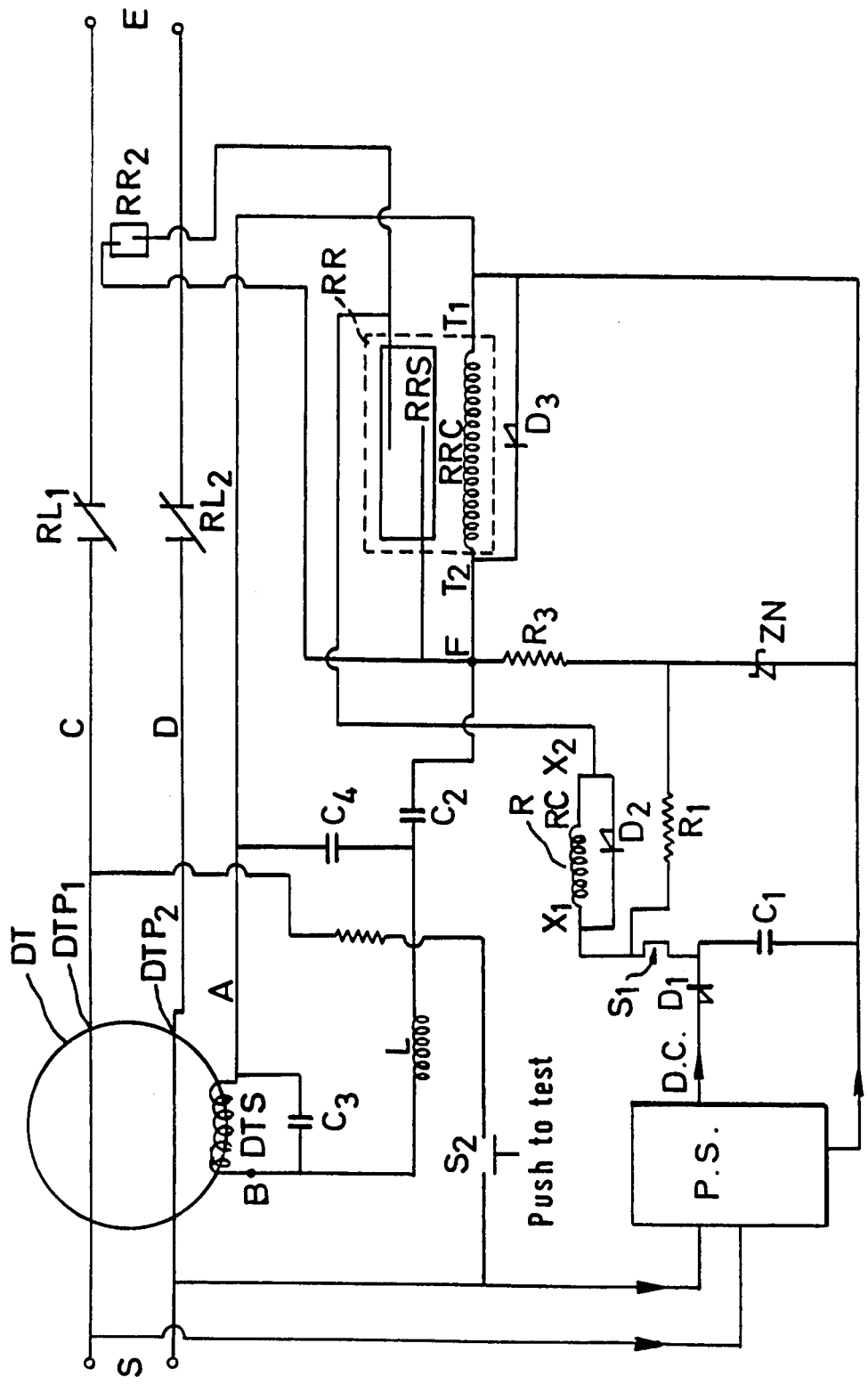

4,255,773

GROUND FAULT INTERRUPTOR

This is a continuation of Ser. No. 816,749, filed July 18, 1977, and now abandoned.

PRIOR ART

Ground fault interruptors are known as such in the art and which are adapted to disconnect a load from a power source upon the presence of an earth leakage or a fault occurring in the load.

The known construction of ground fault interruptors normally envisage the use of a differential transformer, one set of terminals of the primary windings of said transformer being connected to a power source, the opposite set of terminals of said primary windings being connected to a load through the normally closed contacts of a relay or circuit breaker. The differential transformer further comprises a secondary winding for providing a signal to an amplifier the coil of said relay or circuit breaker being connected to the output terminals of said amplifier. Thus, upon presence of a signal in the secondary winding, the signal is amplified by the amplifier and whereby the coil is energized and the contact are open and, whereby, the load is disconnected from the power source. Further, the circuit includes a reset switch.

OBJECTS OF THE PRESENT INVENTION

A object of this invention is to propose a ground fault interruptor and which obviates the disadvantages associated with those of the prior art.

Still another object of this invention is to propose a ground fault interruptor and which avoids the use of an electronic circuitry for the amplifier.

A further object of this invention is to propose a ground fault interruptor and which is comparitively cheaper in costs.

A still further object of this invention is to propose a ground fault interruptor which is comparitively compact in size.

BRIEF DESCRIPTION OF THE INVENTION

According to this invention there is provided a ground fault interruptor having a circuit comprising a different transformer having primary windings for connection to a power source, said transformer having a secondary winding said primary windings connected to a load through the contacts of a relay or circuit breaker, a reed relay connected to the secondary of said transformer, said circuit breaker or relay capable of being connected to a power supply circuit upon the energization of the coil of said reed relay and whereby the contacts are open and the load is no longer connected to the primary windings of said differential transformer, a biasing means for said reed relay and a signal processing circuit connected to the secondary of said differential transformer such as to prevent the biasing current from flowing into said secondary winding and further capable of processing the signal for increasing the sensitivity of said circuit.

DESCRIPTION WITH RESPECT TO DRAWINGS

Further objects and advantages of this invention will be more apparent from the ensuing description when read in conjunction with the accompanying drawing and wherein FIG. 1 illustrates the circuit of this invention for the ground fault interruptor.

For purposes of brevity, the drawing illustrates a ground fault interruptor for use with a single phase power source, However, such an illustration is only by way of an exemplary embodiment in that the said circuit can also be used for two or three phase loads with the duplication of certain components and in a manner which would be obvious to a technician skilled in the art upon reading the ensuing description.

Referring specifically to the drawing, the circuit comprises a differential transformer DT having primary windings $DTP_1$ and $DTP_2$ adapted to be connected to a power source S. Primary windings $DTP_1$ and $DTP_2$ are adapted to be connected to a load E through the normally closed contacts $RL_1$ and $RL_2$ of a relay or circuit breaker R. Differential transformer DT further has a secondary winding DTS and provided in a manner known as such in the art.

One terminal A of secondary winding DTS is connected to one end $T_1$ of a reed relay coil RRC of a reed relay RR having a switch RRS. The other terminal B of secondary winding DTS is connected to the other terminal $T_2$ of reed relay coil RRC through a capacitor $C_2$, said capacitor constituting one of the components of a signal processing circuit. The other component of the signal processing circuit is a diode $D_3$ connected across reed relay coil RRC and such that the cathode of diode $D_3$ is connected to the junction point F. As will be apparent, junction point F is connected to the terminal B of secondary winding DTS. The purpose and function of diode $D_3$ and capacitor $C_2$ constituting the signal processing circuit is described subsequently herein.

The circuit further comprises a power supply circuit PS having a capacitor $C_1$ and diode $D_1$. Any suitable power supply circuit may be used, as the aspect of this invention does not reside in the circuitry of the power supply circuit.

Power supply circuit PS supplies power to the coil RC of relay or circuit breaker R. Coil RC is connected between the power supply circuit PS and reed relay RR. A diode $D_2$ is connected across coil RC and which functions as a surge suppressing diode. One terminal $X_1$ of coil RC is connected to the power supply circuit through a normally closed reset switch $S_1$, the other terminal $X_2$ being connected to the reed relay coil RRC only upon closure of the normally open reed relay switch RRS. Such a manner of connection ensures reed relay RR as a self latching relay.

Thus, and without making a reference to the signal processing circuit and the biasing circuit, upon the presence of a signal voltage in secondary winding DTS, and which occurs in the event of a fault in load E, coil RRC of the reed relay is energized and, whereby, switch RRS is closed. In such an instance, coil RC is connected to the power supply circuit PS and contacts $RL_1$ and $RL_2$ are opened and, whereby, load E is disconnected from the power source.

However, it is recognized in the art, that a ground fault interruptor should possess a high sensitivity and that switch RRS should be made even upon the presence of a fault signal current of only 5 milliamps or lower.

A part of the increase in sensitivity of the circuit can be achieved by providing a magnetic field concentrator for reed switch RRS. One such construction of a magnetic field concentrator, and used in the reed relay RR of the present invention, consists of a magnetic core surrounding the ends of the envelope of said reed switch RRS and extending into limbs. The free ends of said core are spaced from each other and such as to define a space located over the central zone of said envelope and, wherein the free ends of switch RRS lie at the centre of said space. Coil RRC is wound over the core portion of said concentrator.

As described hereinabove, such a concentrator is used in the reed relay RR of the present invention. However, besides such a sensitivity increasing means, other means may also be used. One such other means can comprise a permanent magnet disposed adjacent said reed relay and such that the polarity is complementary to the polarity of the signal current through coil RRC. A still further other means can consist of an additional coil besides that of the reed relay coil and through which a biasing current can be passed.

It has now been found that such a sensitivity increasing means only partly increase the sensitivity, and not to the desired sensitivities as required of a ground fault interruptor. In accordance with this invention, the desired sensitivity is achieved by a biasing circuit and a signal processing circuit.

The biasing circuit consists of resistors $R_1$ and $R_3$ zener diode Zn and, wherein resistor $R_3$ is a variable resistor. Zener diode Zn is provided in order to ensure that the sensitivity does not change due to a fall and rise in the power supply circuit voltage within a predetermined range. As will be apparent from FIG. 1, resistor $R_1$ is provided after reset switch $S_1$ and such that when switch $S_1$ is in an open status no biasing current is supplied to junction point F.

Reference is now made to the theoretical aspect of the invention in order to illustrate the particular manner and the importance of the biasing means in conjunction with the signal processing circuit. Still further, and as will be apparent from the ensuing description, the incorporation of only a biasing means in the absence of a signal processing circuit does not provide the desired results.

Firstly, we consider B to be the magnetic field in gauss required for closing of switch RRS, and $B_1$ the field required for opening of said switch. In such an instance, $B_1$ must necessarily be smaller than B. Thus, the magnetic field produced by the biasing circuit must necessarily be smaller than B, or else switch RRS would be permanently closed. This is with reference to the circuit as illustrated in the drawing and, wherein, resistor $R_1$ is connected after reset switch $S_1$. It will be apparent that if resistor $R_1$ is connected to the power supply circuit PS at a connection point prior to that of switch $S_1$, then the biasing current must necessarily be smaller than even $B_1$, or else the reed switch contacts RRS would never open.

A second increase in sensitivity is provided by the biasing circuit. However, to provide a biasing circuit in the absence of a signal processing circuit is not a desired factor, and which will be further evident from the ensuing description.

For this purpose, and only by way of example, we consider that a voltage of 1 volt is required for the energization of coil RRC to enable switch RRS to make contact.

A first aspect can arise where there is no biasing circuit and, whereby, the bias voltage VB is zero. Further, we consider that the signal voltage Vs induced in secondary winding DTS is 0.5 volts peak. During the first half cycle and that is when terminal B is positive, a voltage of 0.5 volts appear across coil RRC, and which is not sufficient to close switch RRS. Simultaneously, capacitor $C_2$ is not charged and diode $D_3$ is not conducting. During the next half cycle, and when terminal A is positive, 0.5 volts try to appear across coil RRC. However, as coil RRC has a high impedance, the current flows through diode $D_3$ and capacitor $C_2$ is charged to 0.5 volts. When the polarity is again reversed during the next half cycle, and terminal B is again positive, the polarity of signal voltage Vs at this instance is in series aiding to the polarity of the charge on capacitor $C_2$, and both being equal, twice the voltage of the signal voltage appears across coil RRC. In such an instance, the voltage appearing across coil RRC would be 1 volt and, whereby, switch RRs is closed. Thus, the signal processing circuit functions, even in the absence of a biasing circuit, as a sensitivity increase means.

The second aspect is when the voltage VB from the biasing circuit is less than the signal voltage Vs. By way of example, the bias voltage VB=0.4 volts and, whereby the cathode of diode $D_3$ is already 0.4 volts with respect to its anode. Similarly, capacitor $C_2$ is already charged to a voltage 0.4 volts. Thus, during the first half cycle of signal Vs, and when terminal B is positive, 0.9 volts appear across coil RRC closed, but which is not sufficient to make switch RRS. During the next half cycle and when terminal A is positive, diode $D_3$ will conduct only for that portion of the cycle above of 0.4 volts, and capacitor $C_2$ will be charged to 0.5 volts. During the next half cycle, and when terminal B is again positive. 1 volts will appear across coil RRC and, whereby, switch RRS is closed.

The third aspect is when the bias voltage $V_B$ is 0.5 volts. In such an instance, 1 volts appear across coil RRC in the very first half cycle and, whereby contact strips RRS are closed.

The fourth aspect is when the bias voltage $V_B$ is 0.7 volts, and which is greater than Vs. Thus, a voltage of 0.7 volts is always present across coil RRC and capacitor $C_2$ has already a voltage of 0.7 volts. However, diode $D_3$ will be in a non conducting state during other half of the cycle, as the cathode is at a higher positive potential than 0.5 volts which will be present at the anode, even when terminal A is positive. During the next half cycle, and when terminal B is positive, the voltage appearing across coil RRC would 1.2 volts, and whereby contact will be made with a signal even if the signal is of 0.3 volts. Thus the magnitude of bias can control the sensitivity of the devices in conjunction with capacitor $C_2$ and diode $D_3$.

Reference is now made to the fifth aspect and in the instance where there is an absence of condenser $C_2$. In such an instance, the biasing voltage would also be present in the secondary coil DTS, and which would result in a complete or partial saturation of the core of transformer DT. Such a feature, for obvious reasons, is not a desired property.

Alternatively, instead of a capacitor $C_2$, a diode could be provided and which would be a D.C. blocking means to prevent the appearance of the bias voltage across secondary winding DTS. However, in such an instance, the voltage Vs will appear across coil RRC only if it exceeds the biasing voltage $V_B$. Thus, if the biasing voltage $V_B$ is 0.7 volts, it is necessary that the signal voltage Vs must be higher than 0.7 volts in order to appear across coil RRC. Accordingly, any signal voltage Vs below 0.7 volts would not appear across coil RRC and, whereby, sensitivity of the circuit is substantially reduced. Simultaneously, if the bias is reduced to a value substantially below that of the signal voltage Vs, for example 0.2 volts, still a signal voltage of 1.2 volts is required so that a voltage of 1 volts may appear across coil RRC. Thus the presence of only a biasing means in the absence of a signal processing circuit reduces the sensitivity of the circuit. Still another disadvantage is that the current at joint point F will pass through two loads.

Reference hithertofore was made to capacitor $C_2$. Reference is now made to diode $D_3$. If such a diode is not present, then a current in either direction through coil RRC and of a sufficient strength will cause switch RRS to close and, thereby, permitting the latching current to flow through coil RRC. If the direction of the latching current is opposite to that of the signal current at that instant, then the field would tend to go from one direction through zero to the other direction, and while doing so, switch RRS will open and try to stop further latching current through coil RRC. Under these conditions, the switch RRS may get damaged.

Thus, diode $D_3$ ensures that switch RRs will operate only in that direction of field produced by signal from winding DTS and which is in the same direction as latching current.

As will be apparent, the signal processing circuit is provided in series aiding to the signal of winding DTS.

Further, in accordance with this invention, a second reed switch $RR_2$ is connected parallel to RRS. Second reed switch $RR_2$ provides protection against short circuit and overload faults, and is disposed in the vicinity of conductors C and D. Thus, in the event of such faults, the contacts of said second reed switch are closed, and function in a manner, as described hereinabove.

The circuit further comprises capacitors $C_3$, $C_4$ and inductance L, and which collectively constitute a transient suppression circuit to suppress any nuisance signals. A test switch $S_2$ is provided and functions in a manner known as such in the art.

I claim:

1. A ground fault interruptor having a circuit comprising a differential transformer having primary windings for connection to a power source, said transformer having a secondary winding, said primary windings connected to a load through the normally closed contacts of a relay or circuit breaker, a reed relay comprising reed relay contacts and a reed relay coil connected to said secondary winding of said transformer, said circuit breaker or relay capable of being connected to a power supply circuit upon the energization of the coil of said reed relay whereby the contacts are open and the load is no longer connected to the primary windings of said differential transformer, a signal processing circuit comprising a capacitor and a diode, connected to the secondary of said differential transformer and said reed relay, wherein said diode is connected across the coil of said reed relay, one terminal of said diode being connected to said capacitor, a d.c. biasing circuit providing a biasing current and connected to said signal processing circuit and said reed relay, said signal processing circuit also connected between said biasing circuit and said secondary winding of said differential transformer, such as to prevent the biasing current from flowing into said secondary winding, said signal processing circuit processing the signal from said secondary and also that of the biasing circuit for increasing the sensitivity of said circuit and also to allow a flow of signal current in the coil of said reed relay in the same direction as that produced by the circuit to maintain said reed relay contacts in a closed condition.

2. A ground fault interruptor as claimed in claim 1 further including a resetting switch connected to said power supply circuit.

3. A ground fault interruptor as claimed in claim 1 wherein said capacitor is a blocking capacitor for preventing the biasing current from flowing into the secondary of said transformer.

4. A ground fault interruptor as claimed in claim 1 wherein said capacitor is provided in series aiding such that the polarity of the signal voltage from the secondary is in series aiding to the polarity of charge on said capacitor.

5. A ground fault interruptor as claimed in claim 1 comprising further a reed switch provided in parallel to said reed relay and disposed in the proximity of the load carrying conductors.

6. A ground fault interruptor as claimed in claim 1 where a transient suppression circuit is connected to the secondary of said transformer.

* * * * *